Nov. 11, 1958  A. J. HILGERT  2,859,931
VALVE AND ACTUATOR THEREFOR
Filed April 20, 1954  3 Sheets-Sheet 2

INVENTOR.
Adolph J. Hilgert
BY

Nov. 11, 1958 A. J. HILGERT 2,859,931
VALVE AND ACTUATOR THEREFOR
Filed April 20, 1954 3 Sheets-Sheet 3
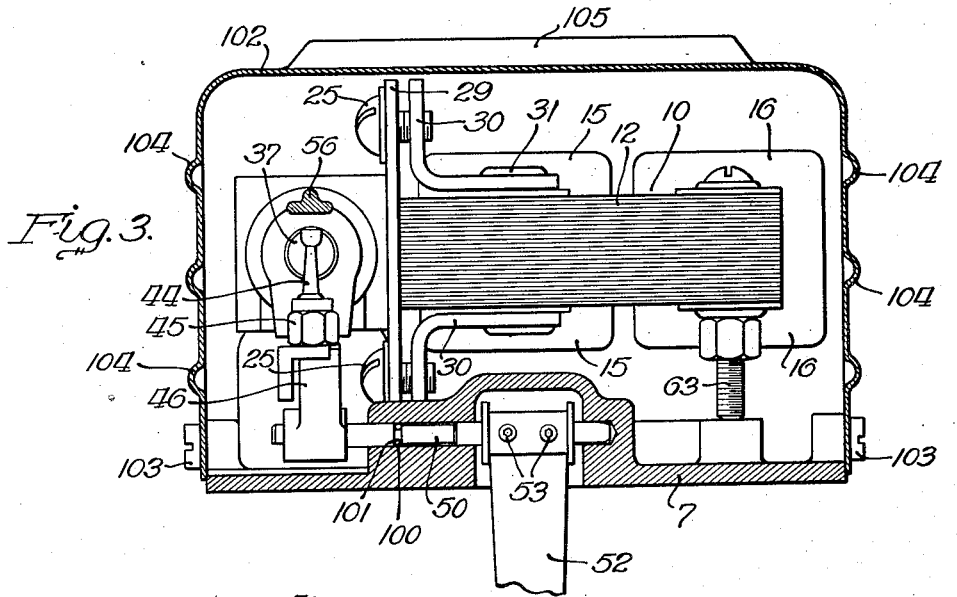
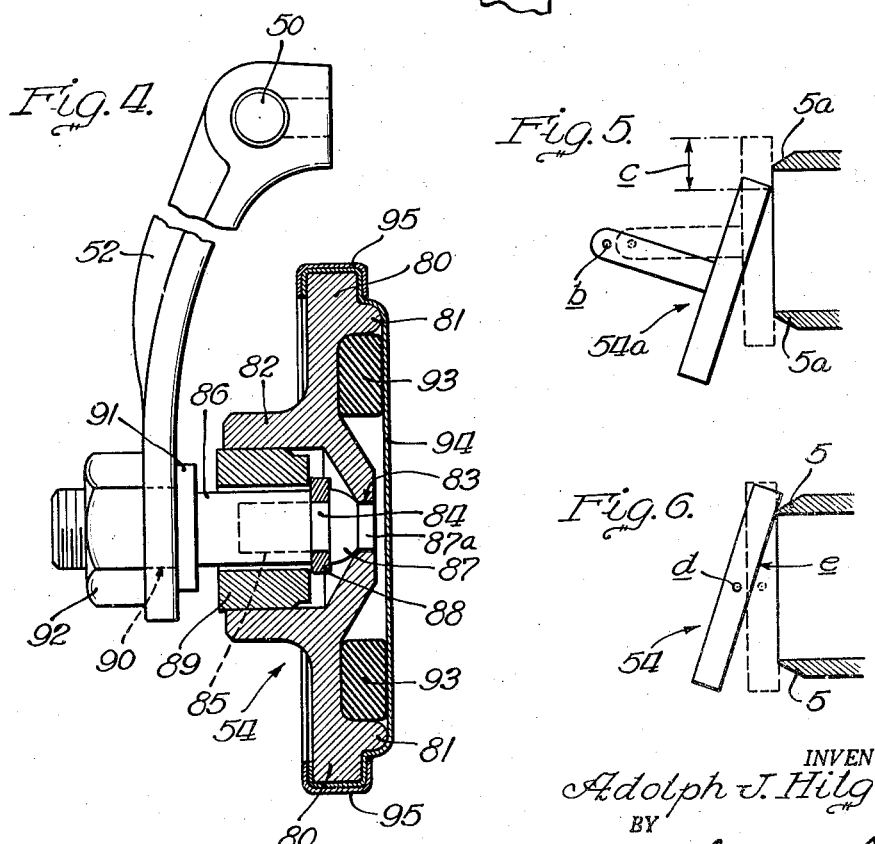
INVENTOR.
Adolph J. Hilgert
BY
Brown, Jackson, Boettcher & Dienner
Attys.

United States Patent Office 2,859,931
Patented Nov. 11, 1958

2,859,931

VALVE AND ACTUATOR THEREFOR

Adolph J. Hilgert, Milwaukee, Wis., assignor to Baso Inc., a corporation of Wisconsin Application April 20, 1954, Serial No. 424,854

3 Claims. (Cl. 251—86)

This invention relates, in general, to valves, and has particular relation to an improved valve and actuator therefor. The present application is a continuation-in-part of my copending application, Serial No. 194,507, filed November 7, 1950 and now abandoned.

While the particular device which I shall describe hereinafter in connection with the drawings is adapted for use for controlling the flow of gaseous fuel to a burner and is shown in connection with an electromagnetic control device of the character disclosed and claimed in the copending application of Carl Wolff, Serial No. 194,505, filed November 7, 1950, now Patent No. 2,687,501, it is to be understood that the device of the present invention may be used for controlling the flow of other fluids and for other similar purposes as suitable or desired.

In prior practice it has been customary to provide between the valve disc and the actuator a pivotal or other suitable connection which will permit self-accommodation of the valve facing to the valve seat when the valve is in closed position. In some of these prior art devices considerable difficulty has been experienced in causing the valve to seal properly against the valve seat. Without proper sealing of the valve against the valve seat when in closed position leakage will occur, which is undesirable and, in the case of gaseous fuel, may be dangerous.

I have found that the reason for this difficulty in obtaining proper sealing of the valve to the valve seat was due to too much spacing between the pivotal or other yielding connection between the valve member and the valve actuator and the plane of the valve facing which seats against the valve seat. With too much such spacing the valve facing wipes laterally over the valve seat to too great an extent as the valve moves to closed position, and where there is, for example, a spring or other means for seating the valve, such means may not have sufficient force to overcome the friction, and the valve will not close properly.

One of the main objects of the present invention is to overcome these difficulties previously encountered and provide an improved valve and actuator with which the valve will seal properly against the valve seat.

Another object of the invention is to provide an improved valve and actuator with which the valve will not wipe laterally over the valve seat to an objectionable extent in closing against the valve seat, or otherwise produce friction which will prevent proper closing of the valve.

Another object of the invention is to provide an improved valve and actuator therefor of simple, compact, and relatively inexpensive construction, and in which the pivotal or other yielding connection between the valve member and the actuator is brought up as close as possible to the plane of the valve facing which seats against the valve seat.

Further objects and advantages and numerous adaptations of the invention will appear from the following detailed description, taken in connection with the accompanying drawings.

In the drawings:

Figure 3 is a sectional view taken on the line 3—3 of Figure 1;

Figure 4 is a fragmentary detail view showing the valve and actuator therefor partially in section and partially in elevation;

Figure 5 is a diagrammatic view showing how lateral wiping of the valve over the valve seat takes place according to prior practice; and Figure 6 is a diagrammatic view showing how this lateral wiping of the valve over the valve seat in the closing movement of the valve is reduced with the valve and actuator of the present invention.

Figure 1:
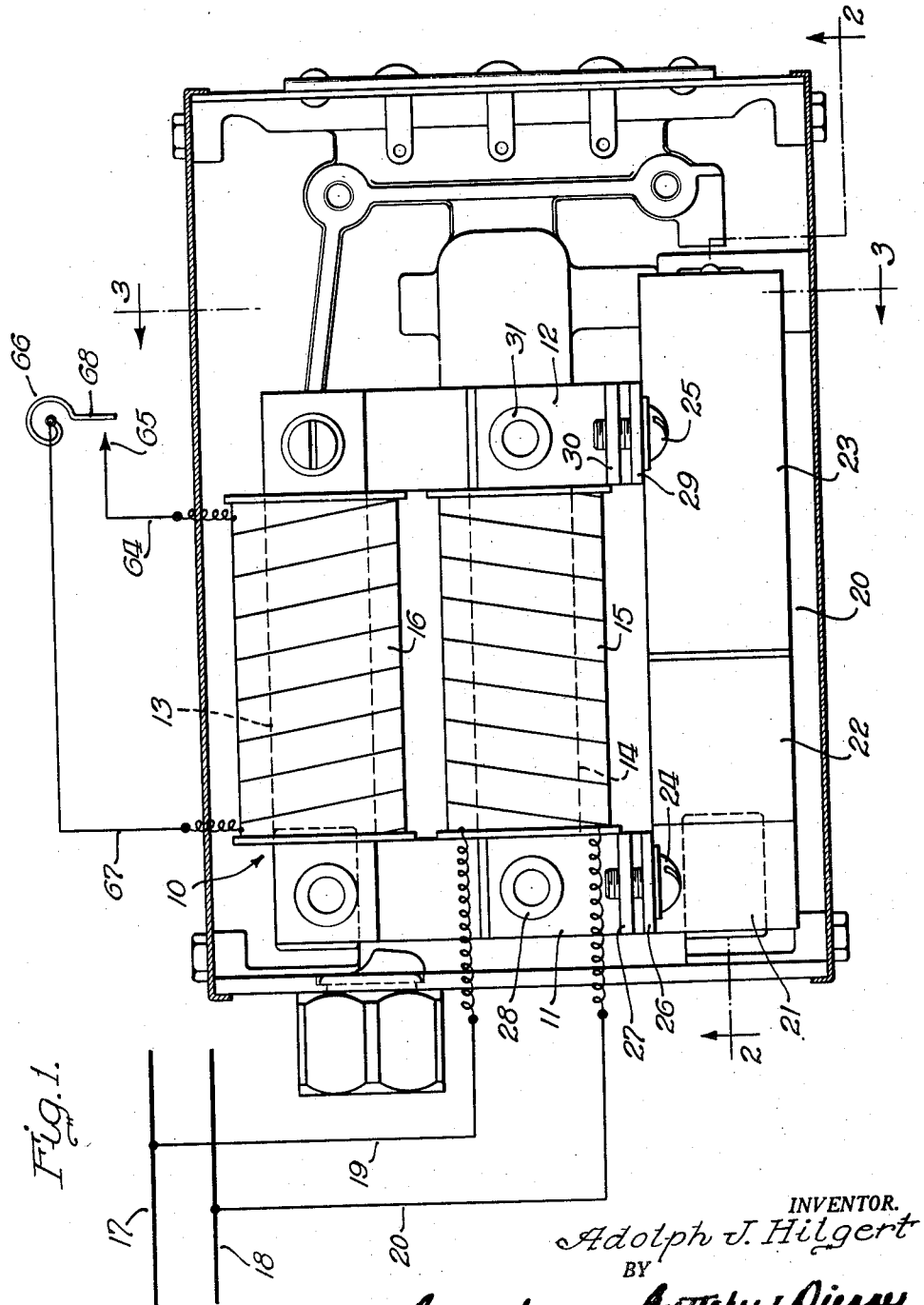
Figure 1 is a plan view of one form of electromagnetic control device employing a valve and actuator embodying the present invention, with the cover of the electromagnetic control device removed.

Referring to the drawings, the embodiment of the invention therein illustrated comprises a valve body 1 having a fluid inlet 2 and a fluid outlet 3. A valve member 54 cooperates with a valve seat 5 at the outlet 3 to control the flow of fluid through the valve body; for example, the flow of gaseous fuel to a burner (not shown), or any other fluid. It will be noted that the controlled fluid tends to hold the valve member 54 closed. This may, of course, vary within the scope of the present invention.

Figure 2:
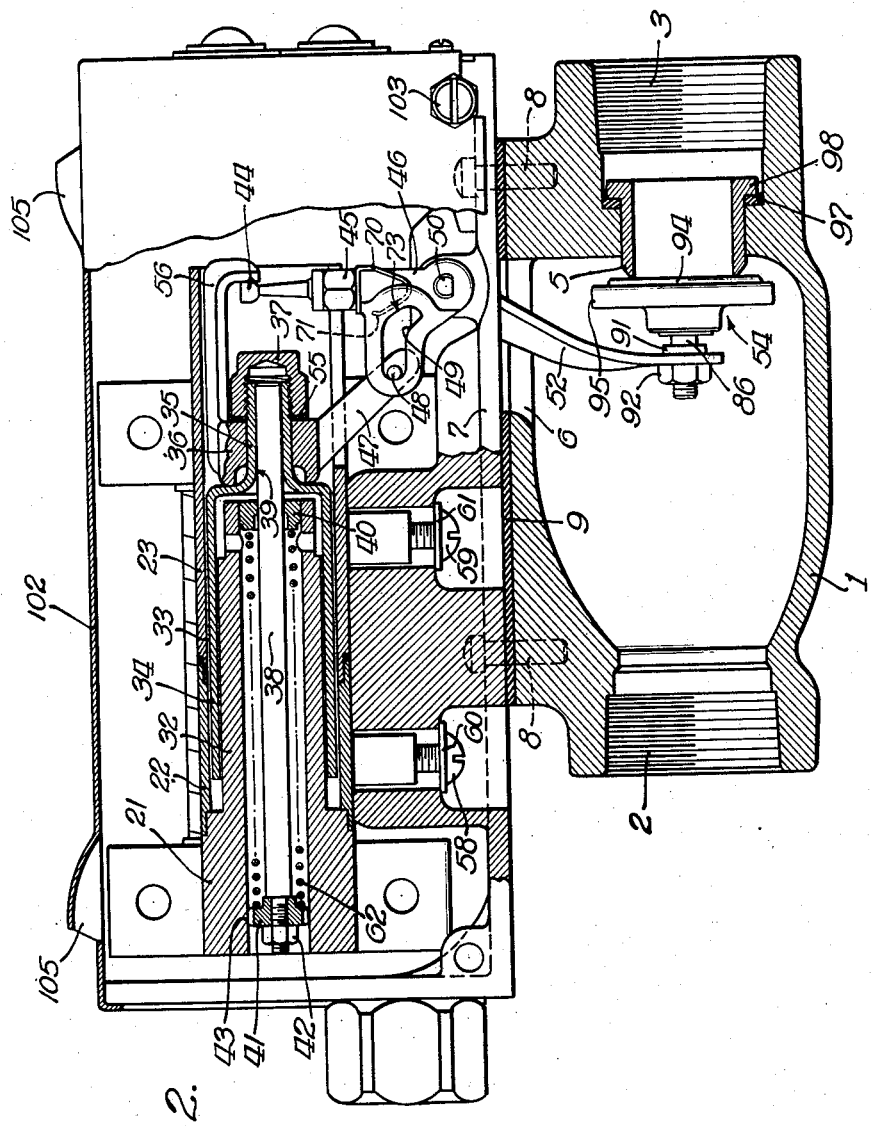
Figure 2 is a sectional view partially in elevation, taken through the electromagnetic operator substantially on the line 2—2 of Figure 1 and showing the valve body in section.

The valve body 1 has an opening 6 covered by a plate 7 which is secured in place over the opening 6, for example, by screws 8 (Figure 2). Sealing means 9 is preferably interposed between plate 7 and valve body 1. The plate 7 is preferably formed of high specific resistance non-magnetic material, such as stainless steel.

The particular magnetic core 10 selected for illustration is of generally rectangular configuration, comprising a pair of parallel legs 11 and 12 magnetically connected at spaced locations by parallel legs 13 and 14 disposed at right angles to the legs 11 and 12. An alternating current primary winding 15 is wound around the leg 14, and a secondary winding 16 is wound around the leg 13. It is to be understood, however, that either winding 15 or winding 16 may be the primary winding, and either winding may be the secondary winding without affecting the operation of the device. Electric power for energizing the winding 15 is supplied from a suitable source, for example, from line wires 17 and 18 of a suitable source of alternating current such as a household current supply line of the type which averages about 115 volts. The terminals of the winding 15 are connected to the line wires 17 and 18 by conductors 19 and 20.

A cylinder is made up of square stock, and has a magnetic end 21, a non-magnetic section 22, and a magnetic section 23 separated from the magnetic section 21 by the non-magnetic section 22. The non-magnetic section 22 may be formed of non-magnetic high specific resistance material, such as stainless steel, or any suitable plastic, or other non-magnetic material. The legs 11 and 12 have projecting ends which abut at spaced locations against the magnetic end 21 and magnetic section 23, and are secured thereto, for example, by screws 24 and 25. The screws 24 cooperate with flanges 26 on the magnetic end 21 and with angular brackets 27 secured to the core 10 at 28. The screws 25 cooperate with flanges 29 on magnetic section 23 and with angular brackets 30 secured to core 10 at 31. The magnetic end 21 has an integral magnetic sleeve 32 which extends through the tubular non-magnetic section 22 and into the tubular magnetic section 23 with an annular space or air gap 33 therebetween.

A non-magnetic and electric conducting cup or sleeve 34 is free to travel in the annular air gap 33. The sleeve 34 is preferably made of electrolytic copper of high conductivity, and is necked or gathered in at one end to form a neck 35 of reduced diameter. An actuating member 36 is secured on neck 35 by a nut 37. A guide stem 38 is press-fitted as at 39 in the neck 35. The guide stem 38 rides in a bearing 40 press-fitted to the sleeve 32 at its right hand end as the device is shown in Figure 2. A bearing 41 is secured by a nut 42 to the left hand end of the guide stem 38. The bearing 41 may be formed of gear pinion stock, and has a smooth radius 43 to permit of low friction motion for the stem 38.

With the parts positioned as shown in Figure 2, the nut 37 is spaced from a projecting stem 44 to provide lost motion therebetween for a purpose which will presently appear. The stem 44 is screwed and secured by a nut 45 to a crank 46. The actuating member 36 has an arm 47 which carries a pin 48. The pin 48 operates in a slot 49 in the crank 46 as will be hereinafter more fully described. The crank 46 is splined or keyed on an actuator shaft 50 which projects laterally from the position of the electromagnetic operator as shown in Figure 3, and has a valve operating arm 52 staked or otherwise secured to the shaft 50 at 53 so that turning of the shaft 50 will swing the arm 52 to open and close the valve 54. The position of the nut 37 relative to the stem 44 may be adjusted by replacing the lock shim 55 with lock shims of different thickness, or by using a plurality of shims.

The actuating member 36 may have an integral hook 56 for cooperation with the stem 44 in closing the valve 54 as will hereinafter appear. Screws 58 and 59, provided with suitable washers 60 and 61 respectively, attach non-magnetic section 22 and magnetic section 23 to the plate 7. Upon the absence of substantial magnetic flux in the gap 33, a spring 62 coiled about the stem 38 and acting against the bearings 40 and 41 urges the stem 38, and accordingly the sleeve 34, toward the left as the device is shown in Figure 2. Additional support for the magnetic core 10 on the plate 7 may be provided by threaded posts 63, one of which is shown in Figure 3.

One end of the secondary winding 16 may be connected by a conductor 64, for example, with a fixed contact 65 of a thermostat 66. A conductor 67 connects the other terminal 68 of the thermostat 66 to the other end of the secondary winding 16. The thermostat 66 may be positioned in a room or other space, or it may be placed where it will be subject to the temperature of a heater, or otherwise disposed as desired. It is also contemplated that the device 66, instead of being a temperature responsive thermostat, may be any other condition responsive means or other device for opening and closing the circuit of the secondary coil 16, as suitable or desired.

For the purpose of eliminating noise in the actuating mechanism between the actuator of the electromagnetically responsive device and the actuated device, a spring 70 is provided. This spring 70 may be in the form of a leaf spring of beryllium copper or other suitable material. It is fastened at one end between the nut 45 and crank 46, and has a V-shaped portion the free leg 71 of which is positioned for engagement with the pin 48 in the valve closing operation. When the actuator moves to the right from the position shown in Figure 2 the pin 48 contacts the spring leg 71 and the spring absorbs the vibrations so that no low level, high frequency noise can be heard.

In the operation of the device as shown in the drawings, the primary winding 15 is always energized from the line wires 17 and 18 or other suitable source of power. With the thermostat 66 in position separating its contact 68 from contact 65, the circuit for the secondary winding 16 is open and this winding is not energized. At this time the magnetic flux established by energization of the primary winding or coil 15 passes through the legs 11, 12, 13, and 14 of the coil 10, and very little flux passes through the air gap 33, for example, from the magnetic sleeve 32 of the member 21 to the magnetic sleeve section 23.

When, however, for example, the temperature to which thermostat 66 is responsive falls, the thermostat closes the contact 68 into engagement with contact 65. This closes the circuit of the secondary winding 16, and current is induced in this winding by the energization of the primary winding 15. This current induces a magnetic flux which opposes the magnetic flux established in leg 13 by the primary winding 15. As a result the flux established by the winding 15 is diverted, for example, through the magnetic member 21, sleeve portion 32 thereof, through air gap 33 to magnetic sleeve member 23, and through this member back through the leg 14 of the core 10.

Since the sleeve 34 is, in effect, a closed loop of good conductivity, there is induced in sleeve 34 an alternating current of opposite polarity to that impressed upon the winding 15. This alternating current so induced in turn induces an alternating flux field about the sleeve 34. The polarity of at least a portion of the field thus induced opposes the magnetic flux established by the energization of the winding 15. As a result the sleeve 34 is repulsed or repelled outwardly or to the right (Figure 2) out of the air gap 33. This causes movement of the actuator nut 37 and actuating member 36 to the right from the position shown in Figure 2.

As the sleeve 32 moves to the right, the nut 37 and stem 38 move to the right with the sleeve 32 and the nut 37 strikes the head at the outer end of the stem 44 and swings the crank 46 clockwise (Figure 2) with accompanying clockwise rotation of the shaft 50. The lost motion between the nut 37 and stem 44 provides for engaging the stem 44 with a hammer blow effect, which overcomes any friction, sticking, or holding of the valve 54 closed, and initiates the opening movement of the valve 54. The pin 48, which moves to the right with the actuating member 36, travels freely in the slot 49 until the nut 37 strikes the head of the stem 44.

It will be noted that the mechanical advantage between the nut 37 and the head of the stem 44 relative to the rotatable shaft 50 is considerably greater than the mechanical advantage between the pin 48 and the upper surface of the slot 49 as the device is shown in Figure 2. Hence in initiating opening of the valve 54 operated by the shaft 50, a high mechanical knock off force is obtained through the linkage mechanism. After the valve 54 is unseated, less force is required to move it to its fully opened position. Accordingly, the pin 48 strikes the upper inclined surface 73 of the slot 49 to impart with a given movement of the actuating member 36 increased swinging movement to the crank 46, and thereby increased and faster movement of the valve to its fully opened position is obtained.

When the valve 54 reaches its fully opened position it will stay in such open position as long as magnetic flux, or at least sufficient magnetic flux, passes through the gap 33 to maintain the sleeve 34 in its repulsed or repelled position.

When thermostat 66 disengages contact 68 from contact 65, the magnetic flux established by energization of the winding 15 is again short-circuited through core legs 11, 12, 13, and 14, and very little flux will exist in the air gap 33. Hence the spring 62 will then move the guide stem 38, and accordingly the sleeve 34, actuating member 36, and nut 37 toward the left as the device is shown in Figure 2. In such movement the pin 48 engages the lower surface of the slot 49 and causes rapid motion of the valve 54 in valve closing direction. After a predetermined motion toward closed position or just short of fully closed position, the head of the stem 44 is engaged by the hook 56 of the actuating member 36. This produces a final closing force with a hammer effect and mechanical advantage similar to the knock off opening action between the nut 37 and stem 44 to complete the closing of the valve with a relatively great force.

While I have shown and described a flux diverting secondary winding 16 and associated core portion, it is to be understood that the secondary winding 16 and the cooperating core portion may be omitted within the scope of the present invention. In such case the thermostat or other means may be placed directly in the circuit between the primary winding and the line conductors 17 and 18. This will provide a line voltage device which is rendered operable by energization of the primary winding 15 and rendered inoperable by opening the circuit for the primary winding.

In the operation of the valve 54 to open position, the pin 48 moves into contact with the free leg 71 of the V-shaped portion of the spring 70. As a result, when the valve 54 is open, the spring 70 absorbs vibrations, and there will not be any low level, high frequency noise such as may otherwise occur by vibration of the pin 48 against the upper inclined surface at the outer end of the slot 49. The spring 70, instead of engaging the pin 48, may engage the outer surface of the slotted portion of the crank 46 to absorb the vibrations for the purpose set forth.

As shown more in detail in Figure 4, the valve 54 may comprise a valve disc 80 having on one side thereof a rounded circumferential rib 81. The disc 80 also has a hub 82 and an axial opening 83. A pin 84 has pressed fit at 85 in a pin 86, and the pin 84 has a generally conical head 87 which is coined or pressed against the edge of disc 80 at the adjacent end of the opening 83 to form a depressed seat for the head 87 of the pin 84. A cylindrically shaped extended portion 87a is formed on head 87 for loose fitting engagement within opening 83 of disk 80. Such engagement prevents substantial lateral movement between disk 80 and pin 84 while permitting pivotal movement therebetween. A washer or shim 88 is interposed between the head 87 of pin 84 and the adjacent end of the pin 86. A sleeve 89 has a tight, pressed fit in the hub 82, and during assembly of the valve member 54 is initially pressed into snug endwise seating engagement with the shim or washer 88 to thereby cause the head 87 of the pin 84 to snugly engage the disc 80 at the margin of the opening 83. The outer end of the pin 86 is then struck with a hammer blow to coin or press the relatively hard head 87 of the pin 84 into the relatively soft material of the disc 80, to form the aforementioned depressed seat and at the same time to produce a slight clearance or looseness between the inner end of the sleeve 89 and the washer or shim 88 as shown. The head 87 of the pin 84 is thus held loosely against its seat in the valve disc 80 to permit rocking movement of said valve disc on the head 87 of the pin 84.

In the aforedescribed structure, the washer or shim 88 may be made of relatively inflexible or non-resilient material. If desired, however, the washer 88 may be made of resilient or flexible material, and the sleeve 89 may have a relatively snug endwise seating fit against said washer to hold the head of the pin 84 relatively snugly against its seat in the valve disc 80. The resilience of the washer 88 permits rocking movement of the valve disc 80 on the head 87 of said pin in spite of the aforementioned relatively snug fit between the end of the sleeve 89 and said washer.

The valve arm 52 is apertured at its lower end at 90 to fit over the adjacent end of the pin 86 and is secured between a flange 91 integral with the pin 86 and a nut 92 screwed onto the pin 86. The valve disc 80—or at least the portion of this disc in which the head 87 is seated—is preferably formed of a softer material such as aluminum, brass, or the like, and the head 87 is preferably formed of harder material such as stainless steel or the like.

A resilient ring 93 of neoprene, which is a synthetic rubber, or of other suitable material, is mounted within the circumferential rib 81 of the valve disc 80. A freely stretchable membrane 94 is stretched over and covers the inner side of the valve disc assembly, and is secured in place, for example, peripherally by a circumferential retention ring 95. The membrane 94 may be formed, for example, of high temperature plastic material or other suitable material which is resistant to gaseous hydrocarbons.

The valve seat 5 is pressed in the outlet 3 with a sealing washer 97 between its flange 98 and the valve body 1.

With the valve assembly shown and described, the cooperation of the head 87 of pin 84 with its seat at the adjacent end of the opening 83 in the valve disc 80 provides a fulcrum or centering swivel between the pin 84 and the valve disc 80 which is disposed up as close as possible to the back side of the membrane 94. As a result, the valve 54 does not wipe laterally any appreciable extent as it swings to closed position. The valve spring 62 will therefore have sufficient force to seat the valve against the valve seat 5, and the valve disc 54 will seal satisfactorily.

As the valve 54 moves to closed position, the portion of the membrane 94 which seats against the valve seat 96 is backed by the resilient ring 93 which takes the stress off of the membrane 94.

In Figure 5 I have shown more or less schematically how lateral wiping of the valve over the valve seat takes place according to prior practice. In this case the valve designated at 54a has pivotal or yielding connection with the actuator at b and the valve seat is indicated at 5a. As the valve 54a closes it wipes laterally on the valve seat an amount shown, for example, at c. As a result the valve spring 62 (Figure 2) frequently has not had sufficient force to overcome the friction and the valve did not close.

However, with the present invention as shown schematically in Figure 6, the pivotal or yielding connection d between the valve 54 and the actuator is shown in close proximity to the plane of the valve facing e and, more particularly, within the plane of the valve disc. As a result the valve has very little or substantially no lateral wiping action over the valve seat 5 in moving to closed position, and the valve will at all times seal properly against the valve seat 5 in its movement to closed position by the spring 62 (Figure 2).

An annular or O-shaped ring 100 (Figure 3) of neoprene or other material which is resistant to gaseous hydrocarbons fits in an annular groove 101 in the shaft 50, and by cooperation with the shaft 50 and with the inner periphery of the opening 101 in the member 7 forms a gas seal for preventing leakage of gas out along the shaft 50 from the interior of the valve body 1. The O- or ring seal 100 has negligible rotational friction.

As shown more particularly in Figures 2 and 3, the electromagnetic control device is enclosed within a housing 102 which may be removably secured in place to the plate or member 7, for example, by screws 103. The sides of the housing 102 may have longitudinal corrugations or folds 104, and the outer surface of the housing 102 may have louvers or openings 105.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. A valve and actuator therefor comprising, in combination, a valve disk having a circumferential rib on one side, a resilient ring mounted within said rib, an inwardly extending circumferential flange on the valve disk extending into position within the plane of said ring, a freely stretchable and imperforate membrane stretched over the outer sides of said valve disk and said ring and secured at its outer periphery and outwardly of the outer periphery of said resilient ring to said valve disk, said flange having an axial seat formed with an opening, an actuator pin connected to said valve disk and having a generally conical head seated for swiveling on said axial seat and within the plane of said resilient ring, said conical head being formed with an extended portion positioned within said opening in said flange, said pin having an abutment thereon, and a hub on said valve disk provided with an annular shoulder cooperating with said abutment to hold the conical head of said actuator pin in operative relation with the seat on said flange, positioning of said extended portion within said opening in said flange preventing substantial lateral movement between said pin and said valve disk while permitting said swiveling movement to afford self accommodation of the valve disk to a valve seat with a minimum of lateral wiping of said membrane on said valve seat as said disk is moved with said pin toward said valve seat.

2. A valve comprising a valve disk having a radial web provided with a tubular hub projecting from one side of said web, an annular rib projecting from the opposite side of said web near the outer periphery thereof, an annular resilient ring seated within said rib and against the aforementioned side of said web, a thin freely stretchable and imperforate membrane covering the outer side of said resilient ring and adjacent surfaces of said rib and web and secured marginally to said web, an annular flange tapering inwardly from said web from position adjacent to the inner periphery of said ring to position in close proximity to said membrane, a second seat in said inner end of said annular flange in close proximity to said membrane, said annular flange being formed with an opening adjacent said second seat, an actuating pin having a generally conical head seated in said second seat and formed with an extended portion positioned within said opening, a sleeve surrounding said pin with an annular space therebetween and having press fit in said hub, and a shim interposed between said conical head and the adjacent end of said sleeve, positioning of said extended portion within said opening in said flange preventing substantial lateral movement between said pin and said valve disk.

3. In a valve, a valve seat surrounding a valve port, a valve operating arm pivoted for swinging movement toward and away from said valve seat, a pin carried by said arm for swinging movement therewith, said pin comprising a head having a generally conical portion and having an end portion, a valve disk having a valve facing on one side provided with a sealing surface, said valve disk having a bore entering the opposite side thereof and also having an annular flange at the base of said bore tapering inwardly toward said valve facing surface and provided with an axial aperture, said pin being received in said bore with said end portion thereof loosely disposed within said flange aperture and with said generally conical portion in fulcruming abutment with said annular flange adjacent said flange aperture and in close proximity to the plane of said sealing surface, and a sleeve having a press fit in said bore and surrounding said pin with an annular space therebetween, said sleeve at its inner end loosely abutting an abutment on said pin at the adjacent end of said head, said valve disk upon movement of said arm toward said valve seat being adapted to initially engage the valve seat in tilted relation thereto followed by rocking of the valve disk into full closed engagement with said valve seat with minimum lateral wiping action of said valve disk sealing surface on said valve seat in such rocking movement, positioning of said head end portion within said flange aperture preventing substantial lateral movement between said pin and disk.

References Cited in the file of this patent

UNITED STATES PATENTS

| | | |
|---|---|---|
| 1,626,581 | Gaunt | Apr. 26, 1927 |
| 1,891,374 | Ehemann | Dec. 20, 1932 |
| 2,206,363 | Murphy | July 2, 1940 |
| 2,596,409 | Johnson | May 13, 1952 |
| 2,642,894 | Burnett | June 23, 1953 |
| 2,675,204 | Johnson | Apr. 13, 1954 |
| 2,720,212 | Kimm | Oct. 11, 1955 |

FOREIGN PATENTS

| | | |
|---|---|---|
| 328,089 | France | Sept. 16, 1903 |
| 175,708 | Great Britain | Feb. 9, 1922 |
| 291,237 | Italy | Dec. 11, 1931 |